United States Patent Office 3,117,834
Patented Jan. 14, 1964

3,117,834
PROCESS FOR THE PURIFICATION AND ACTIVATION OF TITANIUM TRICHLORIDE
Erhard Siggel, Laudenbach (Main), Gerhard Meyer, Obernburg (Main), and Wolfgang Rösener, Erlenbach (Main), Germany, assignors to Vereinigte Glanzstoff-Fabriken AG, Wuppertal-Elberfeld, Germany
No Drawing. Filed Sept. 5, 1961, Ser. No. 135,799
Claims priority, application Germany Sept. 7, 1960
1 Claim. (Cl. 23—87)

The present invention is directed to a process for activating and purifying titanium trichloride and to the use of said titanium trichloride in olefin polymerization reactions. More particularly, the present invention is directed to a process for obtaining substantially pure and active titanium trichloride from titanium tetrachloride.

Titanium trichloride is often used as a catalyst in polymerizing olefins, especially in polymerizing propylene. One of the best known and most advantageous methods for producing titanium trichloride includes the step of reducing titanium tetrachloride. The reduction of titanium tetrachloride to form titanium trichloride can be carried out at high temperatures with hydrogen or by a simpler process with aluminum organic compounds.

When using titanium trichloride in the polymerization of alpha-olefins it is essential that a high degree of purity be obtained. This means that the titanium trichloride should be free or substantially free from titanium tetrachloride. Literature references which are directed to olefin polymerization processes or the manufacture of catalysts which are used in such processes frequently point out that the titanium trichloride must be purified. For the production of high crystalline and purified titanium trichloride, it is necessary to wash the material repeatedly with heptane (see Natta, SPE Journal, May 1959).

Even though the titanium trichloride is washed repeatedly with heptane, it still does not have the degree of purity which is required for the polymerization of olefins. This is established by the fact that the yield of isotactic polymerizate is too low. When titanium trichloride, which has been purified by repeated washings with heptane, is used as a catalyst, the yield of isotactic polymerizate is only about 70% to 80%. This is true even though claims have been made that greater yields are obtainable. Yields of 90% of isotactic polypropylene, for example, are not accurate insofar as they refer to the proportion of isotactic polypropylene after the separation of the polymerizate from the liquids used in the polymerization process. It is known that the polymerization is carried out in dispersion agents such as n-heptane. At the end of the process alcohol is added to the polymerizate dispersion which is then syphoned off with the bulk of the polymerizate. A portion of the atactic polymerizate substances, however, remains dissolved in the dispersion agent and is syphoned off with said agent. This can easily be determined by evaporation. Depending on the nature of the dispersion agent, it may contain from about 5% to 20% atactic polymerizate based on the total polymerizate. This quantity of polymerizate must be taken into account when calculating the yield of isotactic polymerizate, that is, this amount must be added to the percentage of the atactic substances contained in the solid polymerizate.

It is an object of the present invention to provide an improved method of purifying titanium trichloride.

Another object of the invention is to provide a method of producing substantially pure and activated titanium trichloride from titanium tetrachloride.

Still another object is to provide an improved process for polymerizing olefins.

Other objects will become apparent to those skilled in the art from the following detailed description of the invention.

In general, the present invention comprises the discovery that substantially pure titanium trichloride can be obtained if the titanium trichloride is treated with triphenylphosphine after preliminary purification by washing with inert hydrocarbons. The treatment with triphenylphosphine should take place at temperatures no higher than 100° C. in the presence of an inert organic solvent. If titanium trichloride which is purified in this manner is used together with aluminum organic compounds such as aluminum trialkyls in a known manner in the polymerization of olefins an increase in the yield of isotactic polymerizates of 10% or more can be obtained.

The amount of triphenylphosphine which is used in the process can vary from about 1 to about 50 mol percent based on the quantity of titanium trichloride in mols. In our preferred process, from about 1 to about 10 mol percent of the triphenylphosphine is used based on the quantity of titanium trichloride in mols.

Any one of a wide variety of inert organic solvents may be used in association with the triphenylphosphine in the subject process. These inert organic solvents may be aliphatic, cycloaliphatic, or aromatic hydrocarbons which preferably have a boiling point of not more than 100° C. Such inert organic solvents would include n-heptane, benzine fractions having boiling points ranging from 50 to 200°, hexane, isooctane, toluol, xylol, tetraline, decaline and cyclohexane.

In the purification process the mixture is heated under reflux without exceeding a temperature of 100° C. Purification may also be carried out at temperatures as low as 10° C. in which case the reaction mixture must be vigorously agitated. In the latter case the process takes much longer. The treatment time can vary over a wide range, depending upon the temperature, for example, from ¼ to 24 hours.

In the following examples the process is illustrated and is also compared with a prior art process.

*Example 1*

Eight (8) grams of titanium trichloride, which was produced by the reduction of titanium tetrachloride with hydrogen at 800° C., was washed with 50 cc. n-heptane for 15 minutes at 20° C. and then syphoned. The n-heptane had previously been purified by distillation over metallic sodium and was stored over sodium wire and under a nitrogen atmosphere. The washing with n-heptane was repeated. Thereafter, the titanium trichloride with n-heptane to which 5 mol percent of triphenylphosphine, based on the amount of titanium trichloride, was added to the reaction vessel. The mixture was boiled for one hour under reflux. The n-heptane was then syphoned off and the titanium trichloride was washed twice with n-heptane at 20° C.

The titanium trichloride which was purified as described above was put in an enamelled autoclave along with 20 cc. of aluminum triethyl and 12 liters of n-heptane. The autoclave was equipped with a stirring device and had a 20 liter usable capacity. The reaction mixture was heated to 75° C. Thereafter, enough propylene was added to increase the pressure in the autoclave by 4 atmospheres and the polymerization was continued until the polymerizate concentration was about 20%. The remaining propylene pressure was then removed and the autoclave contents were transferred into a vessel containing about 4 liters of a 1% hydrochloric acid solution in ethanol. The catalyst was dissolved by brisk stirring. After cooling to 20° C. the polymerizate was syphoned off and washed with water until a neutral reaction was obtained. The dried polymerizate was extracted in a hot extractor with boiling n-heptane for 24 hours. The total soluble polymerizate portion in n-heptane amounted to 7.5%. The portion of isotactic polypropylene, therefore, was 92.5%.

*Example II*

In this example a quantity of 4 grams of titanium trichloride, which was produced and preliminarily purified as described in Example I, was boiled for one hour under reflux along with n-heptane and 10 mol percent of triphenylphosphine based on the mol weight of titanium trichloride. After syphoning, the titanium trichloride was washed twice with n-heptane as described in Example I and then placed in an enameled autoclave along with 10 cc. aluminum triethyl and 5 liters heptane. The autoclave was equipped with a stirring device and had a 7 liter capacity. The vessel was heated to 75° C. Thereafter, 4 atmospheres of propylene was added to the autoclave. After the polymerization process had been completed the polymerizate was purified and dried as described in Example I. The total soluble polymerizate portion in n-heptane amounted to 10.2%. The yield of isotactic polypropylene, therefore, amounted to 89.8%.

*Example III*

This example illustrates the results that are obtained by following the prior art procedures. In this example, a quantity of 4 grams of titanium trichloride, which was produced as described in Example I, was washed 6 times with 50 cc. n-heptane, each washing being in accordance with the washing described in Example I. The titanium trichloride was placed in a 7 liter autoclave having a stirring device along with 10 cc. aluminum triethyl and 5 liters n-heptane. The autoclave was heated to 75° C. and 4 atmospheres of propylene was added to the vessel. After completion of the polymerization reaction, the polymerizate was purified and dried as described in Example I. The polymerizate contained a total of 20% of substances which was extractable with n-heptane and, therefore, 80% isotactic polypropylene was obtained.

Obviously, many modifications and variations of the invention as hereinbefore set forth may be made without departing from the spirit and scope thereof, and therefore only such limitations should be imposed as are indicated in the appended claim.

We claim:

A process for the activation of titanium trichloride which has been produced by the reduction of titanium tetrachloride, which is contaminated with titanium tetrachloride, and which is to be used for the polymerization of olefins which comprises: washing said titanium trichloride with an inert hydrocarbon, heating said titanium trichloride in a vessel at a temperature not exceeding 100° C. in the absence of olefins but in the presence of an inert organic solvent and triphenylphosphine, the amount of said triphenylphosphine being from about 1 to 50 mol percent based on the quantity of titanium trichloride, agitating the treatment mixture, separating said titanium trichloride from the treating solution, and thereafter washing said titanium trichloride with an inert hydrocarbon, whereby an activated and substantially moisture and titanium tetrachloride free catalyst is obtained.

References Cited in the file of this patent

UNITED STATES PATENTS

| | | |
|---|---|---|
| 2,832,759 | Nowlin et al. | Apr. 29, 1958 |
| 2,909,511 | Thomas | Oct. 20, 1959 |
| 2,925,392 | Seelbach et al. | Feb. 16, 1960 |
| 2,938,890 | D'Alelio | May 31, 1960 |
| 3,063,798 | Langer et al. | Nov. 13, 1962 |